(12) United States Patent
Wang et al.

(10) Patent No.: US 7,461,886 B1
(45) Date of Patent: Dec. 9, 2008

(54) VISOR CAPABLE OF ILLUMINATION WHEN SLIDING

(76) Inventors: Jianhua Wang, 45483 Muirfield, Canton, MI (US) 48188; Jian Yin Tai, No. 1299 Lian Xi Road, Beicai Industry Park, Pudong New Zone (CN)

( * ) Notice: Subject to any disclaimer, the term of this patent is extended or adjusted under 35 U.S.C. 154(b) by 0 days.

(21) Appl. No.: 11/542,725

(22) Filed: Oct. 4, 2006

(51) Int. Cl.
*B60J 3/02* (2006.01)

(52) U.S. Cl. .................... 296/97.11; 296/97.1; 362/492

(58) Field of Classification Search ................ 296/97.1, 296/97.11, 97.12, 97.13; 362/492
See application file for complete search history.

(56) References Cited

U.S. PATENT DOCUMENTS

| | | | |
|---|---|---|---|
| 5,533,776 A | 7/1996 | Agro et al. | |
| 5,653,490 A | 8/1997 | Fink et al. | |
| 6,135,610 A | 10/2000 | Beck et al. | |
| 6,139,083 A | 10/2000 | Fischer et al. | |
| 6,174,019 B1 * | 1/2001 | Collet et al. | 296/97.11 |
| 6,435,593 B2 | 8/2002 | Welter | |
| 6,860,546 B1 | 3/2005 | Fero et al. | |
| 7,032,949 B1 | 4/2006 | Wang et al. | |
| 2006/0138799 A1 * | 6/2006 | Wang et al. | 296/97.11 |
| 2007/0258256 A1 * | 11/2007 | Richard et al. | 362/492 |

* cited by examiner

*Primary Examiner*—Jason S Morrow
(74) *Attorney, Agent, or Firm*—Ronald R. Kilponen

(57) ABSTRACT

A sun visor for a vehicle is shown and described. The sun visor can be slidably adjustable by the user from a first or storage position to a second position and anywhere there between. The sun visor also has an illumination system for lighted viewing in a mirror. These embodiments show and describe an illumination system that can be used with the mirror when the sun visor is located in any position.

3 Claims, 8 Drawing Sheets

VISOR CAPABLE OF ILLUMINATION WHEN SLIDING

FIELD

The present version of these embodiments relates generally to the field of sun visors for vehicles, specifically those visors that are capable of providing illumination the entire time the visor is being translated from a first or resting position to a second position.

BACKGROUND

These embodiments relate to sun visors that can be moved and provide light to an occupant of a vehicle, and more particularly to a sun visor that can provide illumination to the interior of the vehicle the entire time the visor is being moved from a first or resting position to a second position.

Vehicle drivers encounter sunlight when driving. This necessitated the development of a device to block some of the sun's rays without impeding the drivers view of the travel path. Sun visors were developed and have continued to be improved upon. The sun visor is mounted generally to the ceiling of the vehicle by an L-shaped rod. The rod allows the visor to pivot on a vertical axis and rotate on a horizontal axis. Some sun visors are even able to be translated or slid in a horizontal direction on the rod such that the user can adjust the position of the visor left to right based upon the angle of the offending rays of sun.

Other sun visors provide a mirror on one side of the visor which allows the passenger or driver (when stopped) to apply makeup or adjust hair and clothing and perform other things that an individual may wish to do in front of a mirror. It is quite difficult to review makeup or hair when there is no light from outside of the vehicle such as at night and the interior lighting in some background art provides less than desirable light intensity for viewing. It would be beneficial if the sun visor had a lighting source that would shine on the user as they viewed themselves in the mirror of the sun visor.

Some background art shows the use of a light source in a sun visor such that a user may turn on the light and view themselves in the mirror. Much of the background art utilizes a separate switch to turn the light source on and off and this can only generally be done with a sun visor in a single fixed position. In other words the sun visor is fixed in one position to simplify the costs and assembly of the wiring and light source.

Many users do appreciate the benefits of having a sun visor that can translate or slide along a rod horizontally to customize the position of the sun visor left to right relative to the offending sun's rays. These users would also desire a light source for viewing themselves in the mirror contained within the sun visor. The desire to view a mirror located in a sun visor with a light source that can be viewed at all locations of the sun visor complicates the mechanics, assembly and costs of sun visors in general. To date there have been few cost effective, relatively simple to assemble, reliable, functional devices that provide a sliding sun visor in which the lighting will illuminate at all positions of the sun visor when it is translated or slid to various user selected positions between a first position and a second position.

For the foregoing reasons, there is a need for a sun visor that illuminates and is capable of illumination when the visor is translated from a first or storage position to a second or user adjusted position and at any point there between.

SUMMARY

In view of the foregoing disadvantages inherent in the background art, there is a need for a sun visor that illuminates and is also capable of constant illumination when the sun visor is slid or translated horizontally from a first or storage position to a second position.

A first goal of the embodiments is to provide a device that will shield a drivers eyes from unwanted sun rays and still provide a view of the vehicle path.

Another goal of the embodiments is to provide a device that has a built in mirror such that the user may view to check makeup, hair, or other things that a user may wish to view.

It is yet another goal of the embodiments to provide a device that illuminates the mirror viewing area.

It is a still further goal of the embodiments to provide a device that can be slidably adjustable to custom positions such that a user can slide a sun visor to a preferred position to block unwanted sun rays.

An additional goal of the embodiments is to provide illumination that can be lit no matter where the sun visor is located.

These together with other goals of these embodiments, along with various features of novelty which characterize these embodiments, are pointed out with particularity in the claims annexed hereto and forming a part of this disclosure. For a better understanding of these embodiments, the operating advantages and the specific objects attained by its uses, reference should be had to the accompanying drawings and descriptive matter in which there is illustrated a preferred embodiment.

DETAILED DESCRIPTION OF THE PREFERRED EMBODIMENTS

Figure 1:
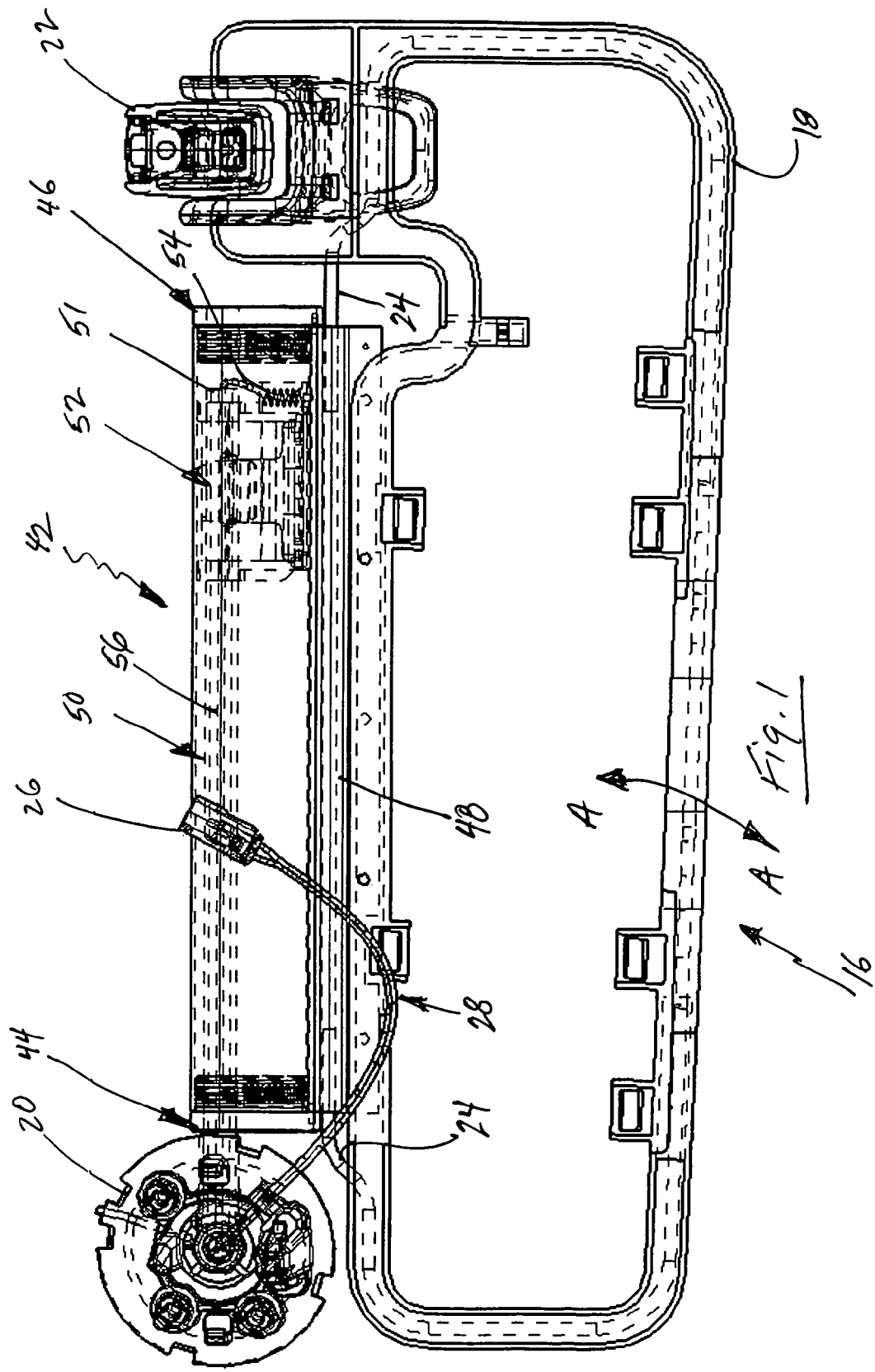
FIG. 1 shows a top view of one embodiment of the lighted sliding visor with elements removed for clarity.

Referring to the drawings in detail wherein like elements are indicated by like numerals, there is shown in FIG. 1 a top view of one embodiment of the lighted sliding visor 16. The visor 16 is comprised of several elements such as the frame 18. Frame 18 is attached to a slider unit 42. Slider unit 42 is attached to an arm 50, slider unit 42 is electrically conductive as is arm 50. Arm 50 is L-shaped with a first end 51 attached to a pivot attachment 20. One embodiment of pivot attachment 20 is rotatably secured to the short section 57 of arm 50. The short section 57 and pivot attachment 20 allow the lighted sliding visor 16 to rotate a pre-determined rotational amount as indicated by arrow A-A in FIG. 1. In order for frame 18 and slider 42 to rotate, frame 18 would necessarily need to be removed from snap attachment 22 first.

Figure 3:
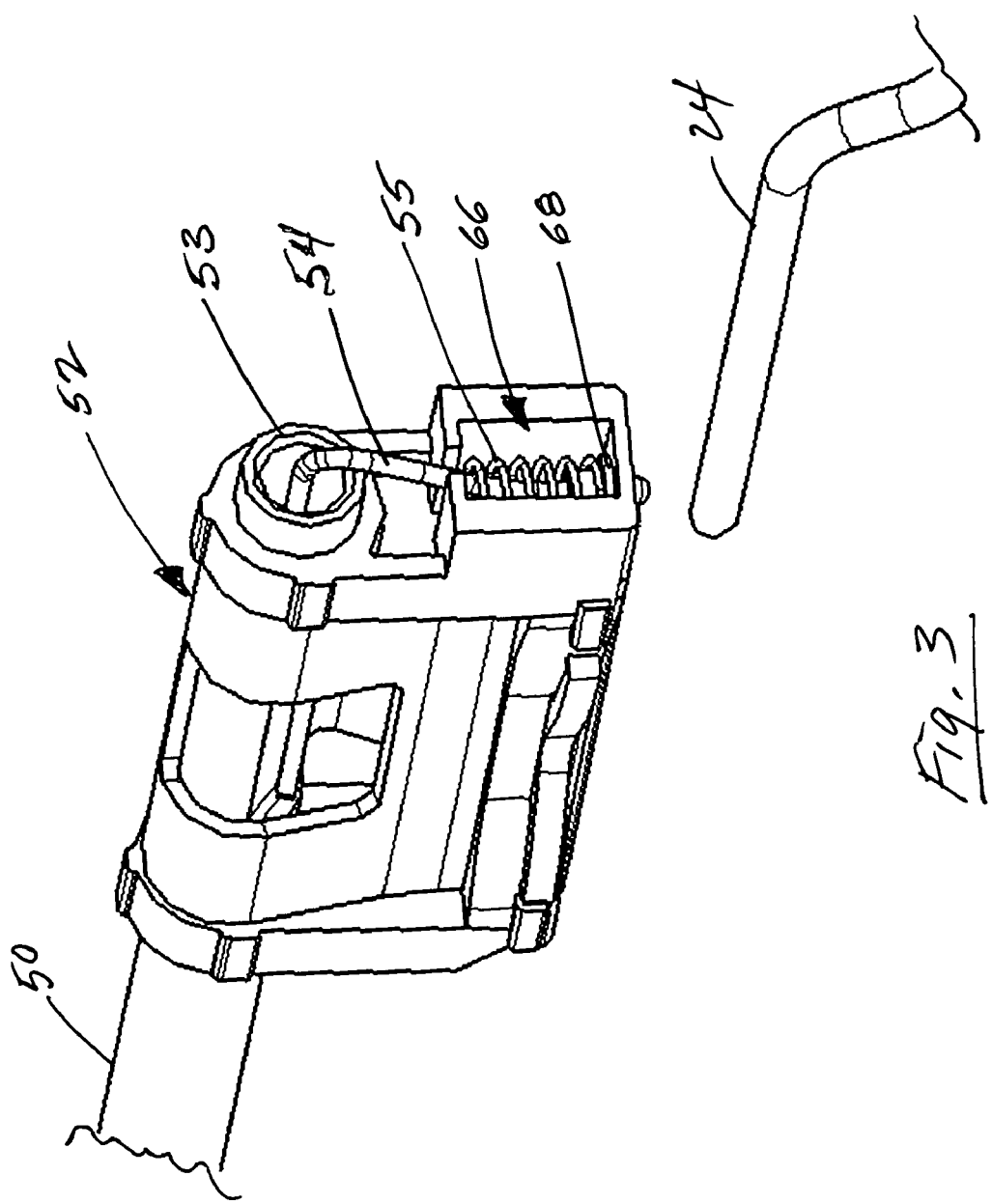
FIG. 3 shows a detailed perspective view of one embodiment of a holder and surrounding structure.
Figure 8:
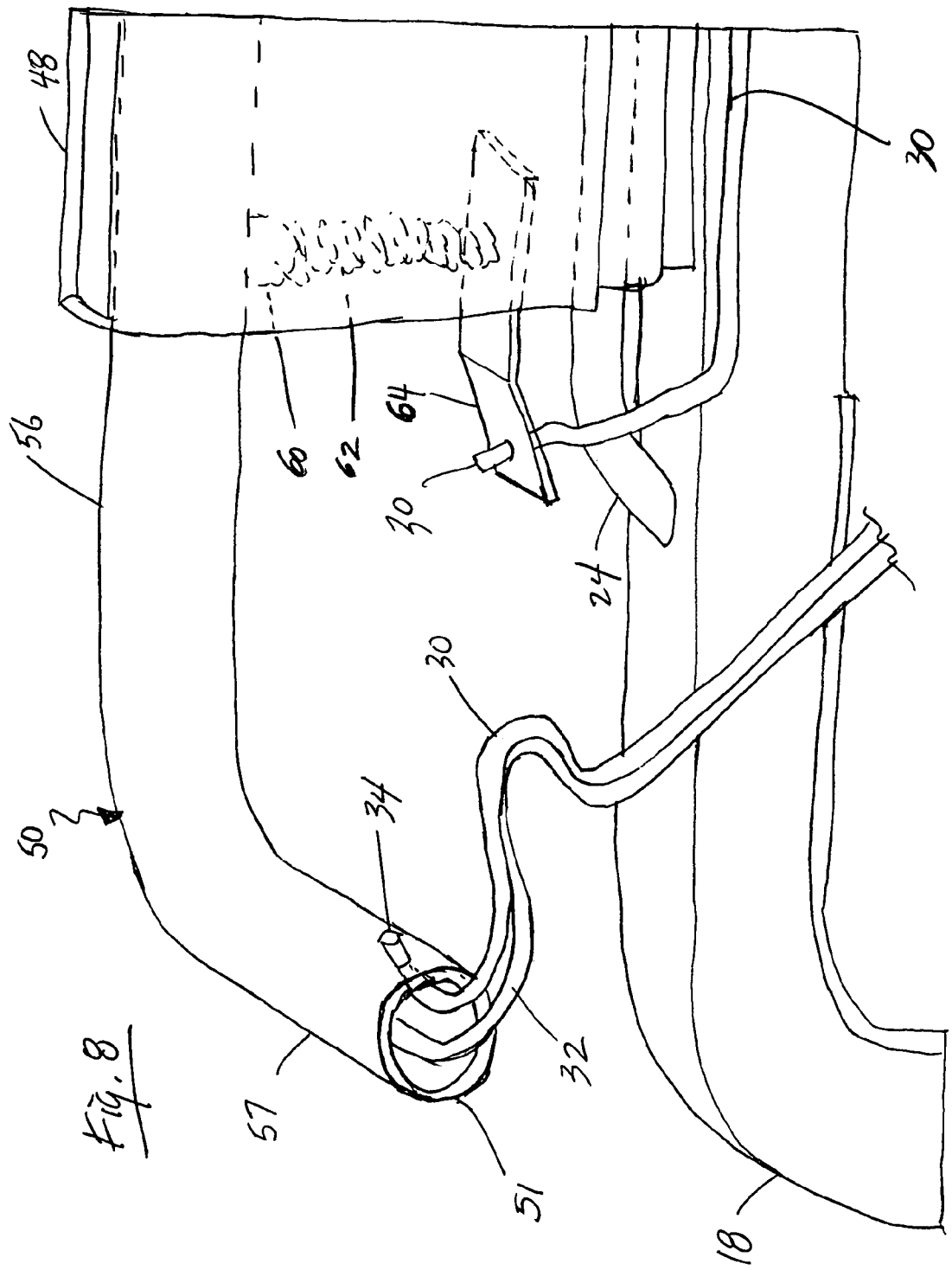
FIG. 8 shows a partial detailed view of one end of an embodiment of a lighted sliding visor.

The frame 18 and slider unit 42 can also rotate around arm 50 long section 56. The arm 50 also has a short section 57. Both the long and short sections 56, 57 are hollow tube, thus allowing wiring 28 from connector 26 to feed into hollow short section 57. The wiring 28 has two wires a first lead 30 and a second lead 32. Both the first and second leads 30, 32 enter arm 50 but only second lead 32 terminates near second end 53 as best shown in FIG. 3. The first lead 30 connects to and makes an electrical contact to the arm 50 near the first end 51 at terminal 34, best seen in FIG. 8. The connector 26 is then connected to the power supply (not shown) of the vehicle.

The slider unit 42 resides on and translates parallel to the long section 56 of arm 50. Slider unit 42 is an electrically conductive oblong tube or housing 48 with a first cap 44 closing the housing 48 at the end near pivot attachment 20 and a second cap 46 closing the housing 48 at the end shown near the snap attachment 22 of FIG. 1. First and second caps 44, 46 are not electrically conductive.

The arm 50 exits the first cap 44 and is rotatably attached to pivot attachment 20 as discussed prior. In FIG. 1, there is a holder 52 on arm 50 and located near second cap 46. The holder 52 is not electrically conductive. The first cap 44 and holder 52 electrically insulate the arm 50 from the housing 48 of the slider 42. The arm 50, shown in FIG. 3, has a second end 53 and the hollow configuration of arm 50 can be seen here. Exiting arm 50 at second end 53 is a connector 54. Connector 54 is connected to second lead 32 that runs through arm 50.

Connector 54 terminates at slider 68. In this embodiment, slider 68 is partially contained within a cavity 66 of holder 52, FIG. 3. Cavity 66 also houses spring 55 which surrounds connector 54 and biases slider 68 through the bottom of holder 52. Slider 68 contacts the floor 43 of housing 48, best seen in FIG. 6. The floor 43 is connected to second lead 32 at terminal 36, also in FIG. 6.

Figure 4:
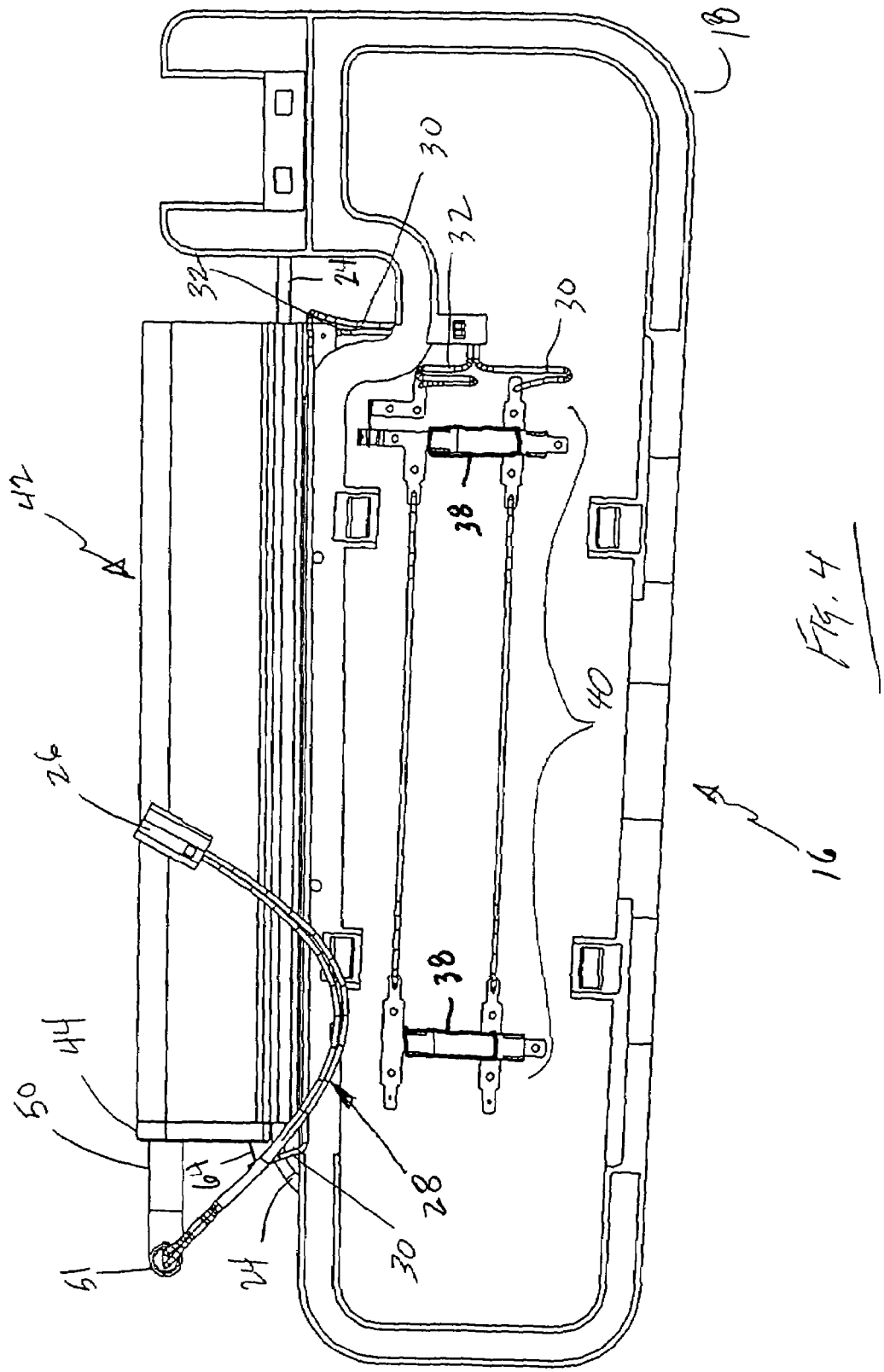
FIG. 4 shows a wireframe top view of one embodiment of a lighted sliding visor.
Figure 5:
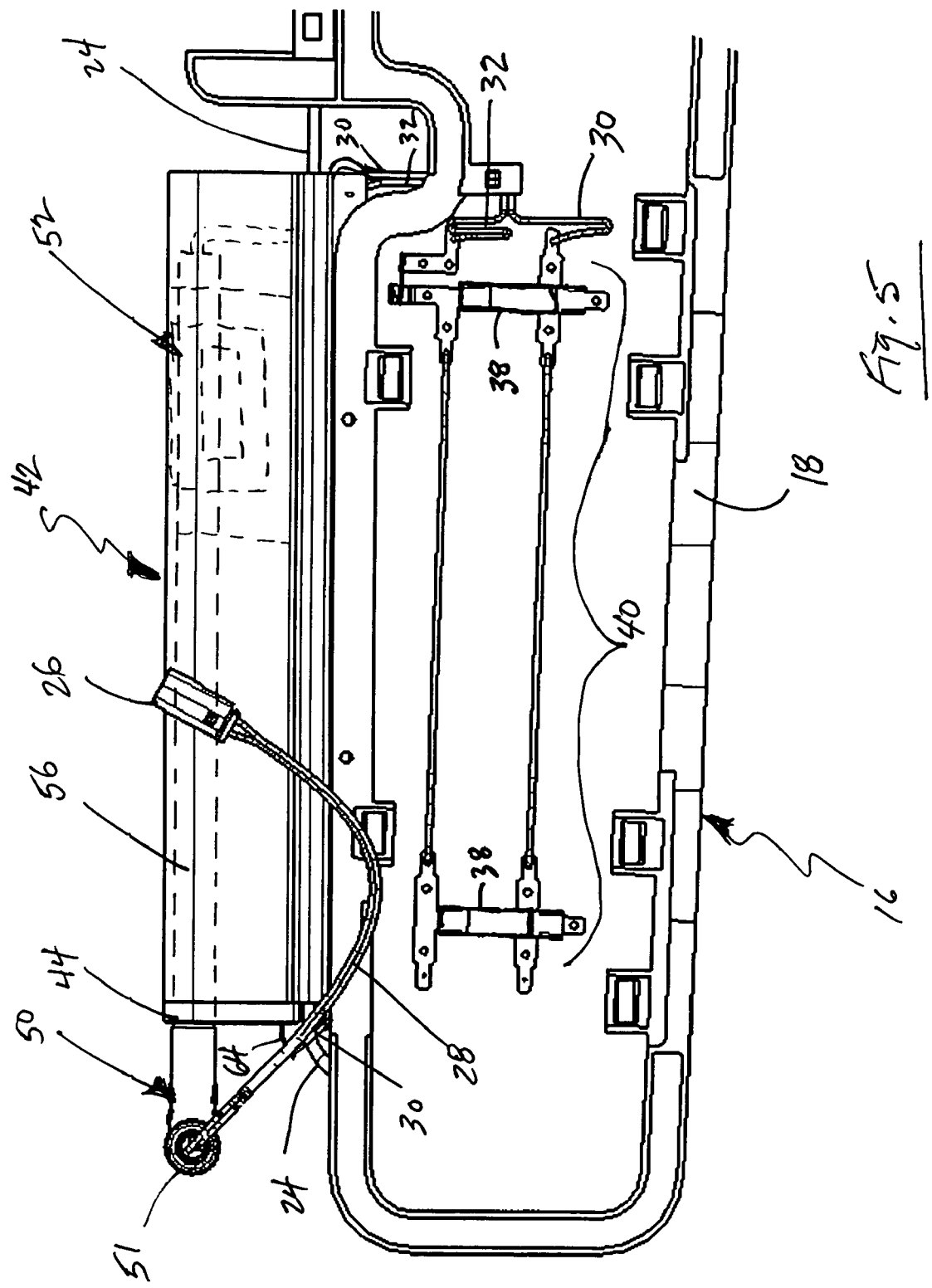
FIG. 5 shows a partial top view of one embodiment of a lighted sliding visor.

FIG. 5 shows second lead 32 connecting to the power consumer 40 to which the light source 38 is connected to in this embodiment. The light source 38 illuminates and completes the circuit and the current flows into first lead 30. First lead 30 runs from the power consumer 40 between the top of the frame 18 and the bottom of the slider unit 42, best seen in FIG. 5. First lead 30 continues to a location near the first cap 44, FIG. 4, and connects to connector 64, FIG. 7. Power consumer 40 may also have a manual switch (not shown) for closing and opening the circuit.

Figure 2:
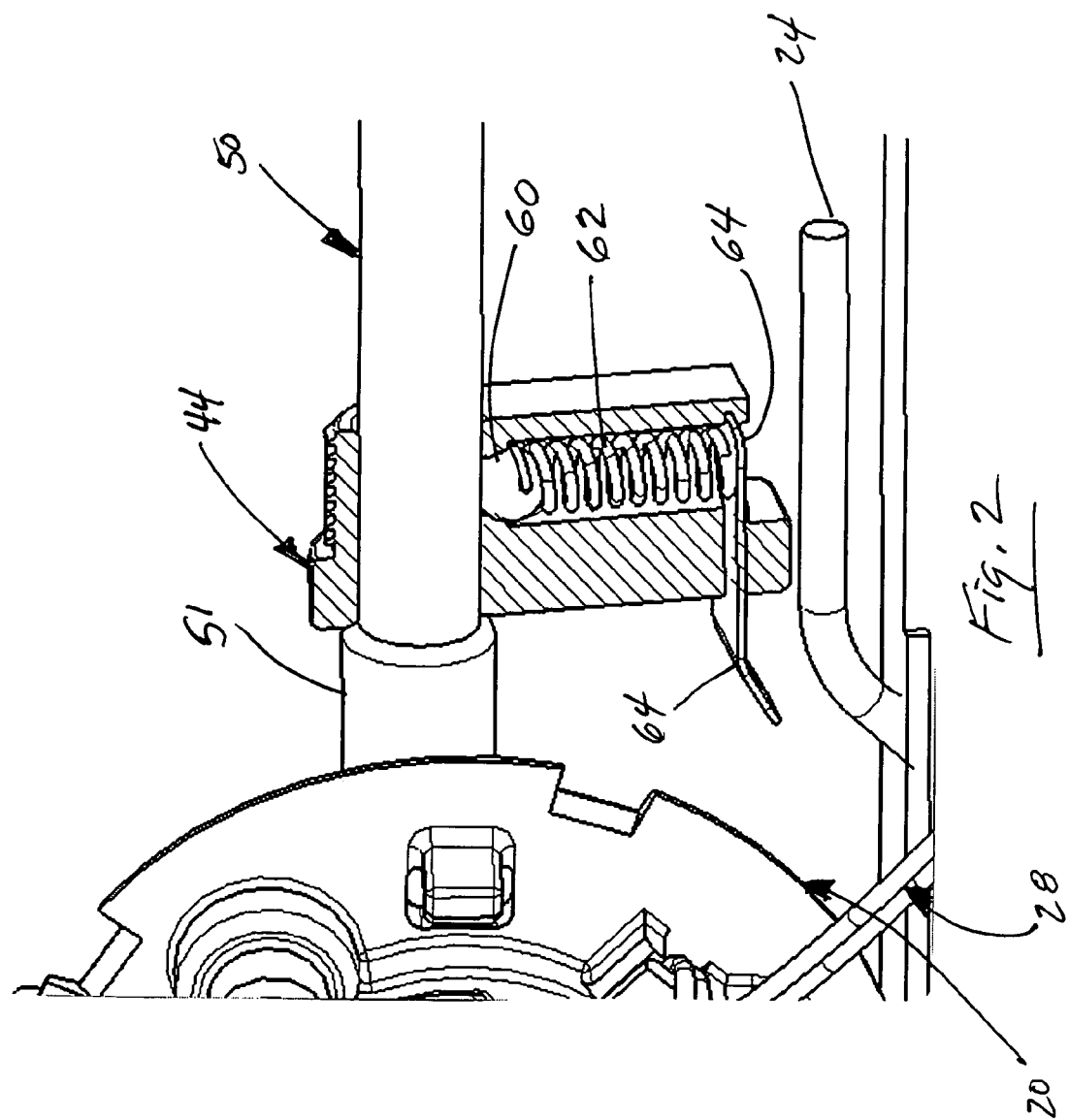
FIG. 2 shows a detailed top view of one embodiment of a first cap and surrounding structure.
Figure 7:
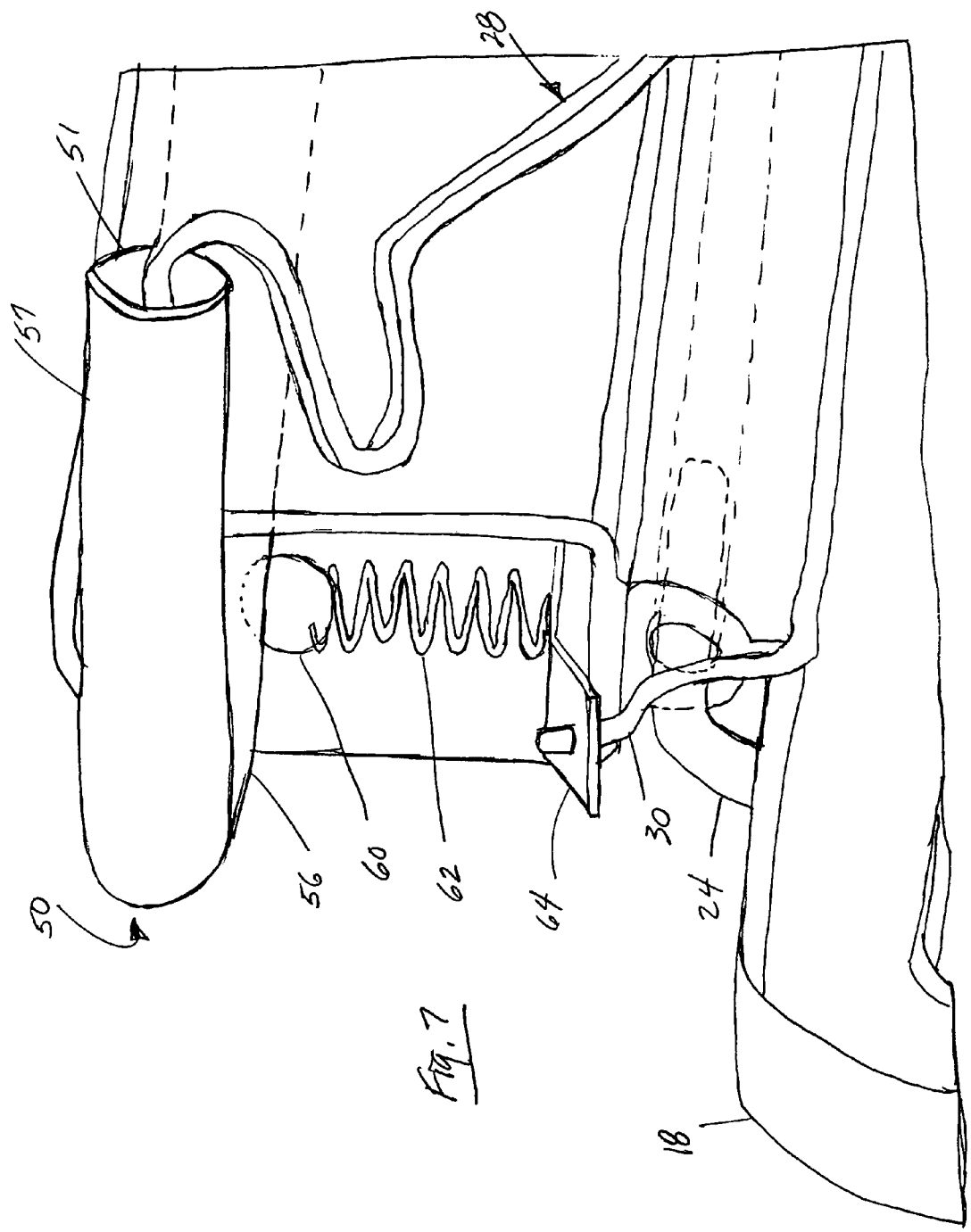
FIG. 7 shows a partial detailed perspective view of another end of an embodiment of a lighted sliding visor.

Connector 64 electrically engages spring 62 which electrically contacts ball 60, FIG. 7. The spring 62 and ball 60 are retained within first cap 44 seen in FIGS. 1, 2, 8. The ball 60 slidably contacts and rolls along long section 56 of arm 50 as the lighted sliding visor 16 is translated horizontally. This thus completes the circuit as short section 57 of arm 50 is connected at terminal 34 to first lead 30, wiring connector 26 and to the power supply (not shown), FIG. 8.

The lighted sliding visor 16 shown in FIG. 1 is in the first position. To put the lighted sliding visor 16 into the second position or any position between the first and second position where the first cap 44 is located near the holder 52, requires the user to remove the frame 18 from the snap attachment 22. The user grasps the frame 18 and translates the frame 18 and slider unit 42 parallel to arm 50 and away from pivot attachment 20. The frame 18 and slider unit 42 translate towards the right in FIG. 1 for example. The frame 18 first cap 44 translates on arm 50 until it approaches holder 52. The position of holder 52 is fixed relative to the arm 50.

Figure 6:
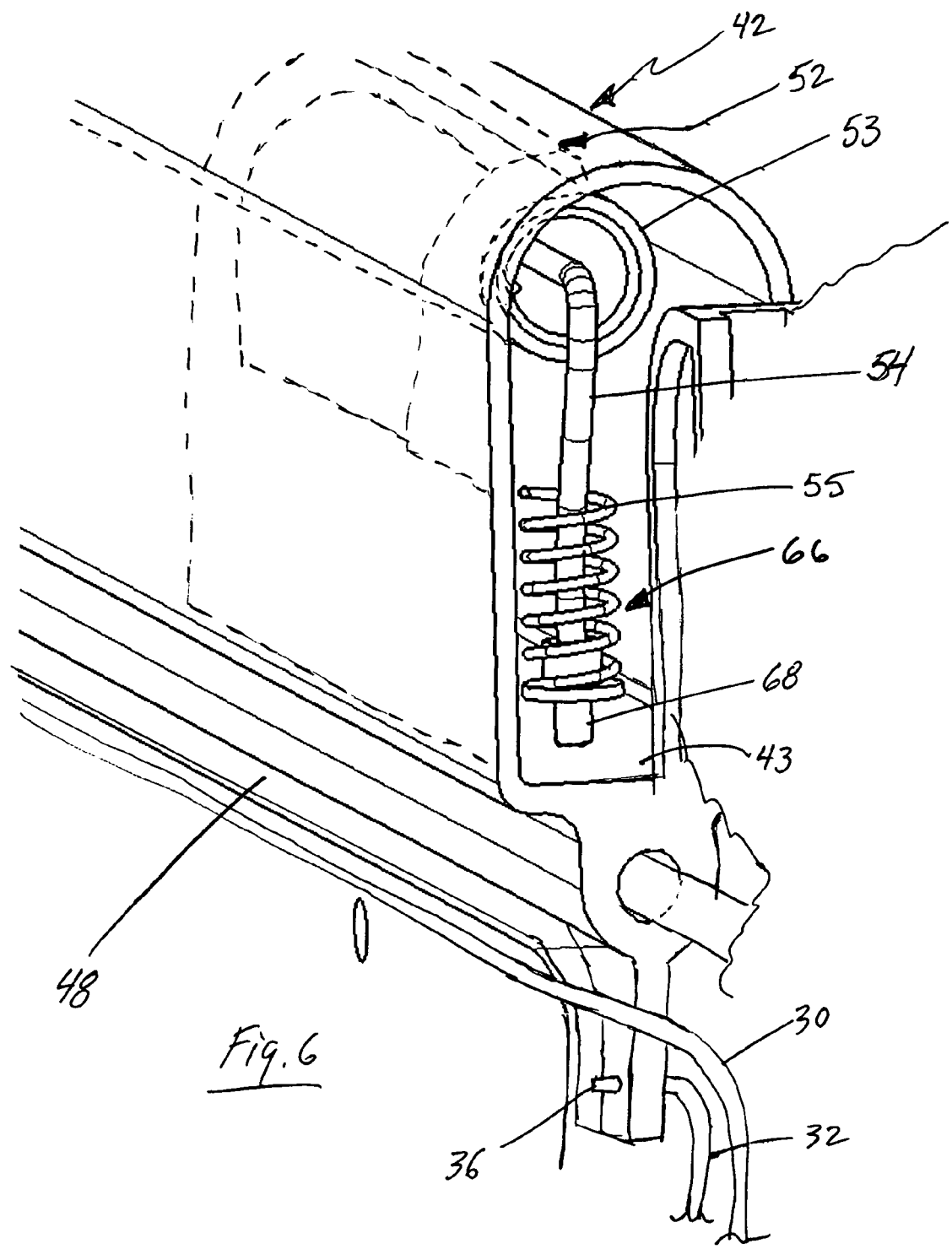
FIG. 6 shows a partial detailed perspective view of one end of an embodiment of a lighted sliding visor.

As the frame 18 and slider 42 are translating away from pivot attachment, the slider 68 maintains contact with the floor 43 of the housing 48, FIGS. 3, 6 and the ball 60 maintains contact with the underside of the arm 50 specifically of the long section 56, FIG. 7. Thus the circuit can remain closed allowing current to flow to the power consumer 40 as the lighted sliding visor 16 is translated. The ball 60 can be electrically insulated from the arm 50 when the visor 16 is in a storage position (not shown).

While FIG. 1 shows a frame 18 and slider unit 42 without any type of covering for better understanding of the embodiments, it should be understood that both the slider unit 42 and frame 18 would be covered with some type of material that provides light blocking effect. Power consumer 40 could also be various other types of electronics other than or in addition to luminescence devices for mirrors such as GPS units, TV screens, voice recorders, phones, music players and many other electronic items. Since power can be supplied to the lighted sliding visor 16 when the visor 16 is located in any position, these devices can continue to be operational.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A device for providing shading and illumination in a vehicle, the vehicle having a power supply, the device comprising:

a frame attached to a slider unit the slider having a housing and a first cap on one end and a second cap on a second end, the housing electrically conductive;

the slider unit slidably affixed to an arm, the arm having a first end affixed to a pivot attachment and a second end, the arm an electrically conductive and hollow tube, a wiring connector affixed to the power supply, the wire connector connected to wiring, the wiring having a first lead and a second lead;

the first and second lead inserted into the first end of the arm, the second lead extending through the arm to the second end of the arm and attached to a connector, the connector housed within a cavity of a holder, the connector attached to a slider, the slider biased against a floor of the holder by a spring, the housing connected to a terminal, the terminal affixing the second lead to a power consumer having a light source;

one end of the first lead attached to the power consumer and the other end of the first lead attached to a connector, the connector attached to an electrically conductive spring and ball, the ball slidably biased against the arm, the arm attached at a terminal to the first lead exiting the first end of the arm and terminating at the wiring connector completing the circuit to the power supply; and whereby, the translation of the frame and slider unit along the arm allows the circuit to be closed providing illumination of the light source or power to the lighted sliding visor from the first position to the second position and positions there between.

2. A device for providing shading and illumination in a vehicle having a power supply, the device comprising:

a pivotal attachment;

a hollow electrically conductive arm having a first end and a second end, the first end attached to the pivot attachment;

the arm slidably attached to a slider unit, the slider unit having an electrically conductive housing;

the slider unit attached to a frame;

the frame attached to a snap attachment in one position and removed from the snap attachment in a second position, the frame housing a power consumer;

a wiring connector for attachment to the power supply;

the wiring connector attached to wiring having a first lead and a second lead;

the first lead attached to the arm near the first end, the second lead inserted into the arm and terminating in a connector, the connector exiting the second end of the arm;

the connector attached to a slider, the slider housed in a holder and engaged by a spring; the spring biasing the slider against a floor of the housing, a terminal attaching the second lead to the housing, the second lead attached to the power consumer, the first lead providing an electrical conduit from the power consumer to a connector located near a first cap of the housing;

the connector engaging an electrically conductive spring and ball, the ball slidably contacting the arm, the arm connected at a terminal to the first lead which runs to the wiring connector completing the circuit; and whereby, translation of the visor allows the ball to contact the arm and the slider to contact the housing thereby completing the circuit and providing power to the power consumer no matter where the visor is translated relative to the arm.

3. A device for providing shade and illumination in a vehicle, the vehicle having a power supply, the device comprising:

a frame removably affixed to a snap attachment, the frame attached to slider unit, the slider unit having an electrically conductive housing with a floor and a non-conductive first cap on one end and a non-conductive second cap on a second end, the first and second caps slidably attached to a hollow arm, a non-conductive holder located on the arm near the second cap, the arm rotatably affixed to a pivot attachment, the arm having a first end and a second end, the arm electrically conductive, the first cap located near the pivot attachment when in a first position and the first cap located near the holder in a second position, a wiring connector electrically attached to the power supply, the wiring connector electrically connected to wiring, the wiring having a first lead and a second lead, the first and second lead entering the arm at the pivot attachment, the first lead connected near the first end of the arm to a terminal;

the second lead entering the first end of the arm and electrically connected to a connector, the connector exiting the second end of the arm, the connector attached to a slider, the slider and connector housed in a cavity of the holder, a spring engaging the connector and slider, the spring for biasing the slider against the floor of the housing, the housing attached to the second lead at a terminal, the second lead electrically attached to a power consumer, the power consumer located within the frame; and the power consumer electrically affixed to the first lead, the first lead connected to a connector located near the first end of the arm, the connector attached to an electrically conductive spring and a ball, the ball contacting the arm and slidable along the outer surface of the arm as the visor is moved from the first position to the second position, thereby closing the circuit and providing power to the power consumer as movement of the visor occurs from the first position to the second position.

* * * * *